United States Patent [19]

Kiesche et al.

[11] Patent Number: 4,873,753
[45] Date of Patent: Oct. 17, 1989

[54] CONTROL SYSTEM FOR A ROTATION STATION FOR REMOTELY INSTALLING A MECHANICAL TUBE PLUG

[75] Inventors: Eric A. Kiesche, Ringgold, Ga.; Samuel B. Crabtree, Chattanooga, Tenn.

[73] Assignee: Combustion Engineering, Inc., Windsor, Conn.

[21] Appl. No.: 151,115

[22] Filed: Feb. 1, 1988

[51] Int. Cl.[4] .................................................. B23P 7/00
[52] U.S. Cl. .................. 29/157.3 R; 29/523; 29/723; 29/726
[58] Field of Search .................. 29/523, 157.3 R, 723, 29/726; 364/140

[56] References Cited

U.S. PATENT DOCUMENTS 4,513,786 4/1985 Sodergren et al. .................. 29/523

4,722,122 2/1988 Overbay .................. 29/723

Primary Examiner—Allen MacDonald
Attorney, Agent, or Firm—Ronald P. Kananen

[57] ABSTRACT

A controller for an apparatus for installing a mechanical tube plug includes a controller having a controller console remote from the tube installation site and a solenoid assembly located proximate to that site. The console includes switches and indicators for providing a rotation control signal to the apparatus. The solenoid assembly includes a circuit for receiving a torque indication signal from the apparatus and an alarm circuit for setting the torque at a predetermined upper limit in response to a signal input at said controller console. The circuit operates to terminate rotation control and disable the apparatus when said limit is reached. Other features of the controller are also disclosed.

16 Claims, 8 Drawing Sheets

FIG. 5.
BACK VIEW OF SWITCH PANEL

CONTROL SYSTEM FOR A ROTATION STATION FOR REMOTELY INSTALLING A MECHANICAL TUBE PLUG

BACKGROUND OF THE INVENTION

This invention relates to a method and apparatus for controlling the installation of mechanical tube plugs. More particularly, this invention relates to a controller system for installing mechanical tube plugs including recording, monitoring, and controlling the torque applied in the process to evaluate the work done to assure the integrity of the plug installation. Still more particularly, this invention relates to a method and apparatus for controlling mechanical tube plugging through a remotely-located control console cooperating with a proximately-located solenoid box for controlling tool operation, and sensing, monitoring, and controlling torque during working. More particularly, this invention relates a method and apparatus for controlling tooling for remote installation of mechanical plug tubes for controlling a rotation station for brushing, sizing, plug rolling, and a plug cartridge insertion for placing the plug into a tube sheet.

A rotation station for remotely installing mechanical tube plugs is shown and described in detail in pending U.S. application Ser. No. 853,587, to issue on Feb. 2, 1988 as U.S. Pat. No. 4,722,122 (PCT Publication No. WO87/06333 published on Oct. 22, 1987). As is well-known, a heat exchanger in a nuclear steam supply system extracts heat from a closed primary loop fluid that circulates through the reactor and the heat exchanger and transfers the heat to a closed secondary loop fluid that circulates through the heat exchanger and a steam turbine where energy is extracted in the form of mechanical energy. Such heat exchangers usually include a vessel having a plurality of U-shaped shaped tubes around which the fluid of the secondary loop passes and through which the fluid of the primary loop circulates. The heated water passes into and through the U-shaped tubes with both ends terminating in a tube sheet so that the fluids are in a heat exchange relationship while passing through the U-shaped tubes. In such systems, it is imperative to maintain the fluids of the two loops isolated one from another. As some of the tubes of the heat exchanger deteriorate, those tubes are removed from service and the heat exchanger placed back into operation.

A method and apparatus for removing a heat exchanger tube is described in the aforementioned publication. By plugging both ends of the tube where the tube terminates at the tube sheet, the deteriorated tube may be removed from service. Thus, a known method for providing a tube includes equipment for and the steps of inserting a mechanical plug having an outside diameter slightly less than the inside diameter of the tube being plugged and inserting the tube plug flush with the tube sheet. Thereafter, the plug is expanded by rolling the inner surface of the plug forming a mechanical roll-joint between the outer surface of the tube plug and the inside surface of the tube. Thus, the steps of brushing, insertion, and rolling in such a heat exchanger are well-known in this art.

As further described in that publication, the rolling equipment, whether manual or automatic, is typically designed to stall at a predetermined torque so that the integrity of the mechanical roll-joint can be inferred from the torque at which the rolling equipment stalled. The rolling equipment is calibrated periodically to insure a consistent and acceptable roll-joint. As further described in the aforementioned publication, the rotational torque applied during each step of the tube installation process is recorded and monitored in real time to assure that the torque applied during each step of installing a mechanical tube plug provides its contribution to the integrity of the installation of a mechanical tube plug. The recorded torque curves further provide documentation for verification of the integrity of the installation or for regulatory purposes.

It is an aim of this invention to improve control of that type of rolling equipment and to control the method of plugging described. Thus, a method and an apparatus for remotely controlling the installation of mechanical tube plugs in which the actual torque applied in the installation process is monitored and controlled is needed to assure the integrity of the plug system. Such a system and apparatus would permit real-time monitoring of the torque applied in each step of the tube installation process, as is desirable, but from a location remote from the site of the tube plug. By featuring all manual control components and monitoring functions at a control panel remote from the tube plugger and connected only by a control cable to a solenoid box proximately-located at the site of operation, an operator may remotely control all of the operations of the equipment, while at the same time monitor those operations, if desired, by television, hard copy or storage monitoring. Such a system includes a strip-chart recorder for recording the torque observed at each state of operation, and means for making a hard copy recording of the torque curves generated during the process. A feature of the control panel would be to provide an auxiliary current loop output which could be used for interfacing with a computer to digitally record the torque signals for purposes of on-screen display, magnetic storage, and subsequent data analysis if necessary.

Thus, it is an overall objection to this invention to provide a method and apparatus for controlling the steps of installing mechanical tube plugs from a remote location.

It is an additional object of this invention to provide a remotely-positioned control console for controlling the operations of plug removal, brushing, plug insertion, and plug rolling during a mechanical tube plugging installation by a remotely-located control panel connected to a proximately-located solenoid box for controlling each of those operations.

It is an additional object of this invention for the control system of the type described to provide a feedback sensing system for torque monitoring and having a torque limit for plug rolling and for safety during the plugging steps.

It is an additional object of this invention to provide a control system which senses and monitors torque during mechanical tube plugging wherein a torque limit system can be overridden.

It is an additional object of this invention to provide a control console for manually controlling plug insertion, drive, and removal operations in a mechanical tube plugging system of the type described.

These and additional objects of the invention will become apparent from the written description of the invention, taken in conjunction with the accompanying drawings.

SUMMARY OF THE INVENTION

The present invention relates to an improvement in the prior art techniques for installing mechanical tube plugs in that a controller is located at a control console at a remote location for controlling each of the functions performed during the method of installing mechanical tubes. In accordance with the present invention, a control console is provided with all of the mechanical operators and monitors for controlling each of the functions of the mechanical tube plugger for connection by a single control cable to a solenoid box for controlling the steps of insertion, removal, and rolling. The combination of the controller components and a solenoid junction permits the operator to be located at a site remote from the plug installation at the steam generator. The controller includes a feedback sensing system for torque monitoring with latching so that a torque limit may not be exceeded, unless intentionally overridden, during rotation, brushing, size rolling, and plug cartridge insertion for placing the plug into the tube sheet.

In a preferred embodiment, the control console includes means for manually controlling all functions pertaining to the actuation of the tools for plug installation. Clockwise (CW) and counter-clockwise (CCW) push-button switches are provided to control the brushing, sizing, and plug-rolling so that the CW switch, when engaged, is electrically latched until either reset or a torque limit is reached. The CCW switch is disabled while the CW switch is engaged and can only be initiated if the reset switch has been depressed or if the CW switch is unlatched. Thus, for roll operations the torque limit can be overridden by the pushing of a trip button.

The control console includes a sensing system comprising a transducer, an amplifier, and a current sensing stage so that deflection of the torque transducer, preferably a strain gauge, provides a voltage signal to an amplification stage located in the solenoid box assembly. The signal from the transducer is amplified and converted to a current signal to minimize interference and line loss through long lengths of cable between the solenoid box and the remotely-located control box.

Means are also provided at the remote console for: (a) setting the trip point, and calibrating the trip point for the alarm module at the solenoid box; (b) resetting the circuit to operate after tripping when desired by the operator; (c) controlling hydraulic tool remover operations; and (d) controlling cartridge insertion and plug drive during the plug insertion operation. The audio pick up and video cameras at the work site are monitored by screens and sound systems at the control console. The intensity of camera lights located at the work site is also controlled from the control panel. The video output from the video cameras may be recorded on a VCR at the control console, with souln in real time, or with audio overwritten thereon by the operator. Several channels for video selections at a plurality of monitors are also provided.

These and other features of the invention will be better understood from the detailed description which follows.

DESCRIPTION OF THE PREFERRED EMBODIMENTS

Figure 1:
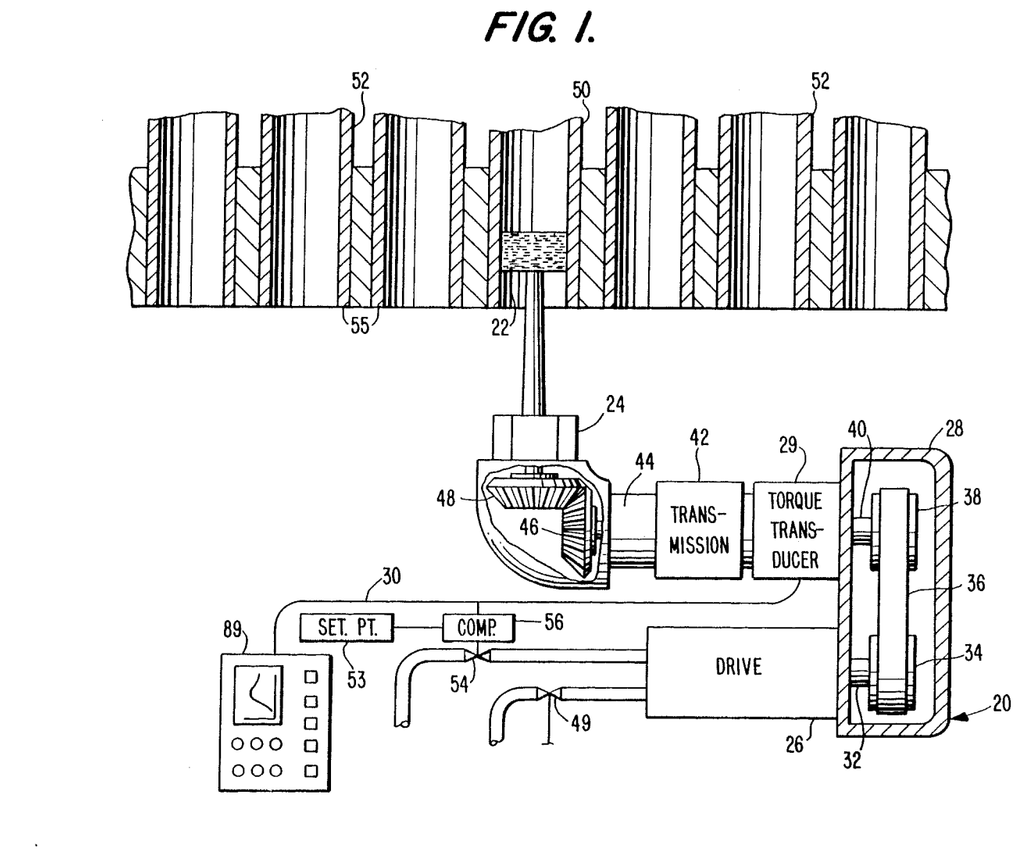
FIG. 1 is a schematic drawing, partly in section, showing a prior art rotation station drive aligned with a tube for plugging while undergoing a brushing operation as a representative function of the plugging operation.
Figure 6A:
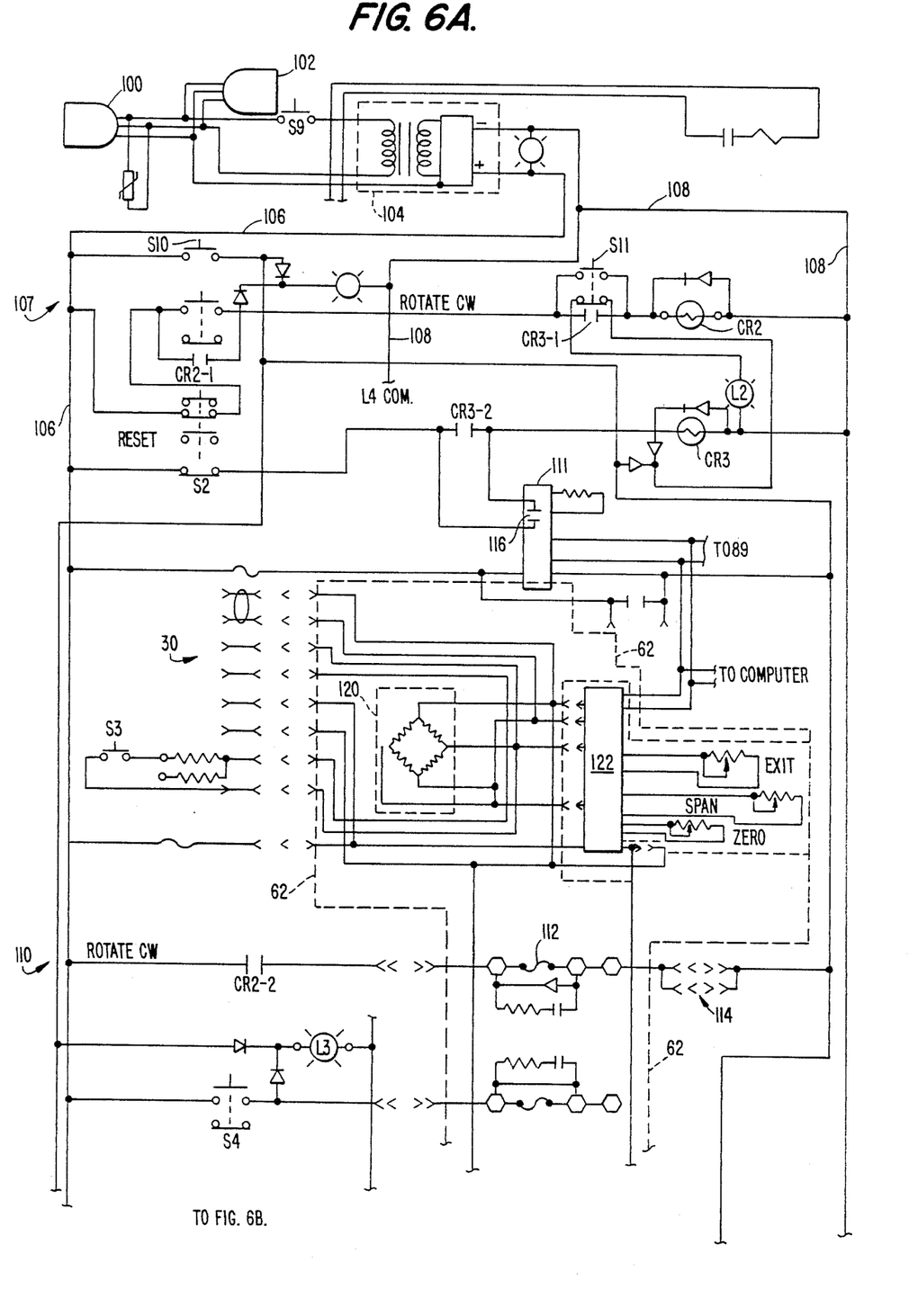
FIGS. 6A–6C are more detailed, but simplified, wiring diagrams of the components of the control console and solenoid box for receiving control inputs from the control panel and providing control outputs to the system, while monitoring and recording torque inputs from the system.
Figure 6B:
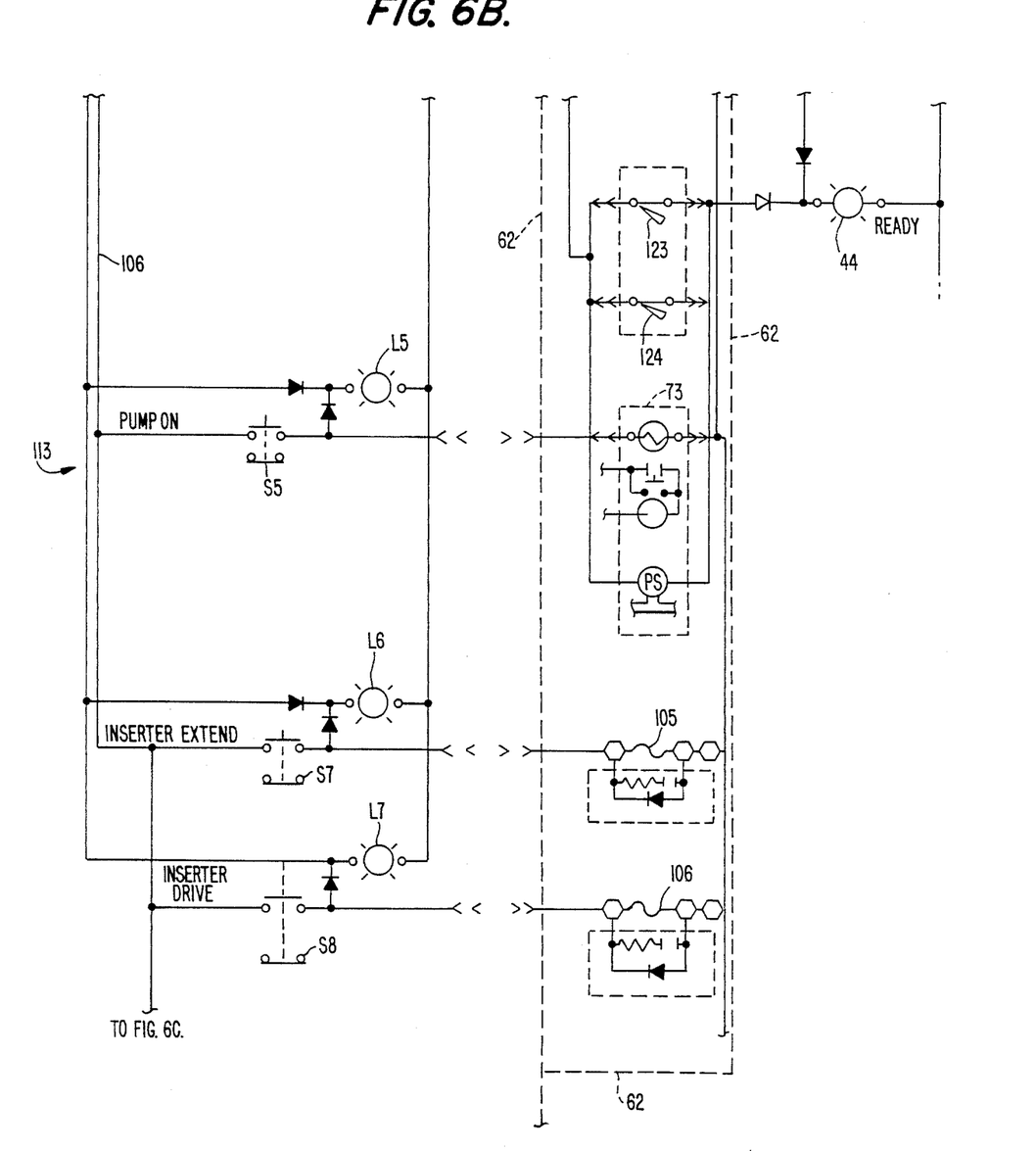
Figure 6C:
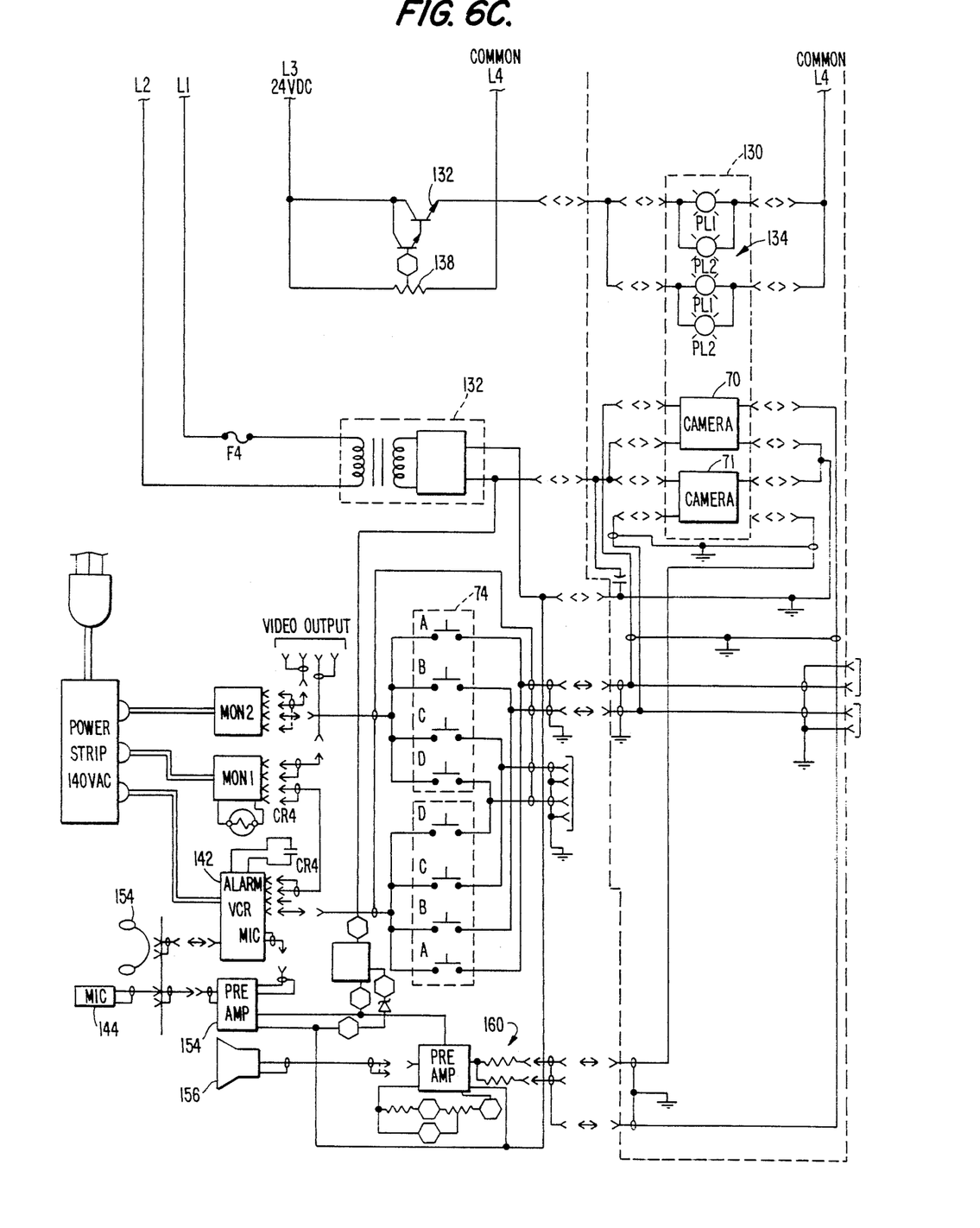

For background understanding, FIG. 1 shows a prior art technique according to the aforementioned publication with a rotation station drive aligned with a tube to be plugged. While that drawing shows the brushing operation, it should be understood that such or other equipment is also used for sizing the tube, inserting a mechanical tube plug into the tube, and rolling the plug while monitoring the torque as a function of time for each of those operations. Thus, a rotation station 20 for use with a robotic manipulator (not shown) includes a wire brush 22 inserted into the drive chuck 24 of the rotation station 20. The rotation station 20 includes a reversible pneumatic drive 26 such a Cleco Nut Runner Model 157, mounted on the rotation station body 28. The torque produced by the reversible pneumatic drive 26 is transferred to a torque transducer 29, to provide an output signal on a lead 30. That torque signal is used to measure torque as shown in FIG. 6. The torque transducer 29 may include an isolated reaction transducer attachment for the Cleco Model 157 through a drive shaft 32, a drive pulley 34, a timing belt 36, a pulley 38, and a drive shaft 40. The torque transducer 29 is also mounted from the rotation station body 28. The rotational output of the torque transducer 29 which is provided to a transmission 42 which has its output shaft 44 connected to a beveled gear 46 engaging a corresponding beveled gear 48 in a gear box 47 to change orientation of rotation from horizontal to vertical.

With a brush 22 installed in the drive chuck 24 of the rotation station 20, a robotic manipulator positions the rotation station 20 beneath a tube 50 to be plugged so that the shaft of the wire brush 22 is axially-aligned with the tube 50 of the plurality of heat exchanger tubes 52. The brush 22 is moved axially with respect to the shaft until its bristles are in contact with the opening of the tube 50. Rotation of the brush 22 is initiated by opening a solenoid valve 54 to provide air to the reversible pneumatic drive 26. That opening is controlled at the remote console through the solenoid box of this invention. The brush 22, while rotating, then extends into the opening of the tube 50 to the region where a tube plug (not shown) will seat and the inside surface of the tube 50 is brushed for a predetermined period of time to remove foreign matter, such as oxide. After completion of the brushing operation, the brush 22 is removed from the drive chuck 24 and a tube entrance roller-cage-mandrel assembly is inserted into the rotation station 20. During the tube sizing operation, the end 55 of the brushed tube where the tube is welded to the tube sheet is rolled, with a sizing roll sufficiently small to enter the opening to make the opening substantially circular to accommodate insertion of a tool plug. During the tube sizing operation, the torque applied to the roller-cage-mandrel assembly is also converted to an electrical signal by the torque transducer 29 and controlled by the apparatus of this invention. When the tube entrance sizing operation is completed, the direction of rotation of the reversible pneumatic drive 26 is reversed releasing the roller-cage-mandrel assembly from the entrance of the tube 50 along with the rotation station 20 and a tube insertion device positioned beneath the tube so that a tube plug on a magazine inserter is inserted by a single plug inserter into the entrance of the tube 50 to be flush with the primary surface of the tube sheet. Such tube plugs, and their insertion, are shown, by way of example, in U.S. Pat. No. 4,513,786 which is incorporated by reference.

After a tube plug is inserted by a tube plug inserting device into the tube sheet, a tube plug roller-cage-mandrel assembly is inserted into the rotation station 20 and drive chuck 24, and the rotation station is again installed on the robotic manipulator. A tube plug roller-cage-mandrel assembly is inserted into the tube plug and the solenoid valve 54 is energized to provide air to the reversible pneumatic drive 26 to provide torque to the drive chuck 24 of the rotation station 20 to roll the interior surface of the tube plug as described in the aforementioned publication. Again, the torque provided to rotate the drive chuck 24 during this operation is of interest.

The details of the brushing, sizing, plug insertion, and plug rolling steps with respect to real-time torque monitoring are described in greater detail in the aforementioned publication which is hereby incorporated by reference.

Figure 2:
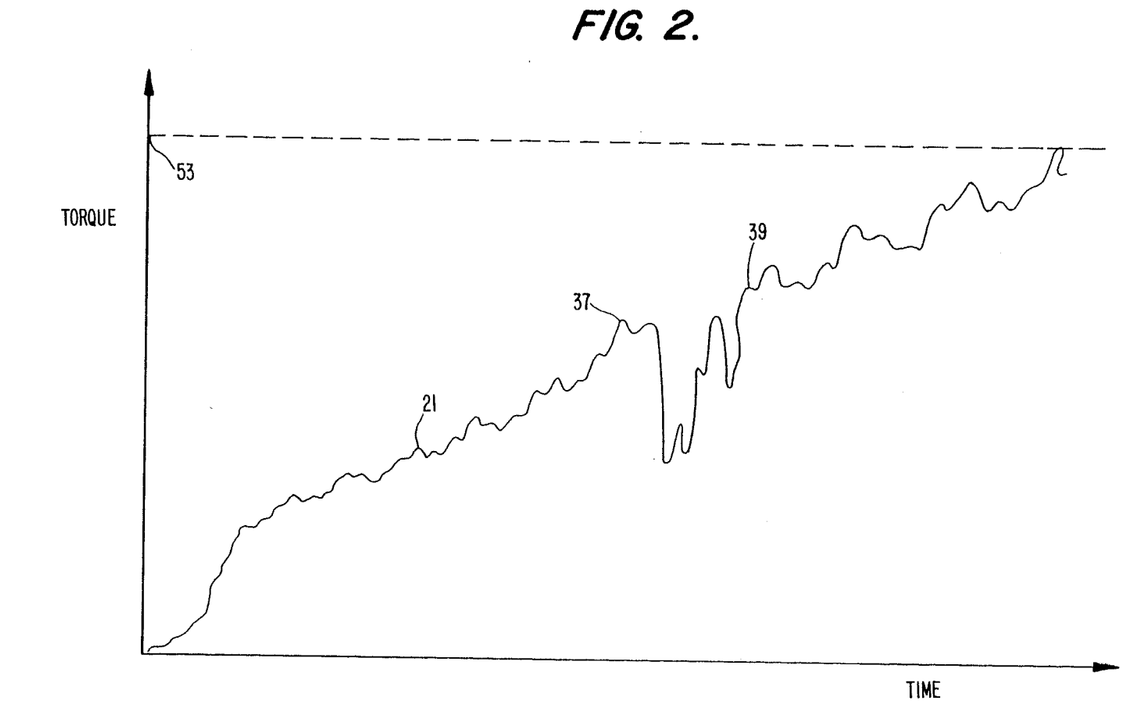
FIG. 2 is a typical torque as a function of time curve produced during a tube internal surface brushing operation.

FIG. 2 shows a torque as a function of time-curve 21 produced during a plug-roll operation as recorded from the apparatus of FIG. 1. As noted in the discussion in the aforementioned publication, the torque as a function of time during each step of the operation is monitored and sensed to provide useful information to the operator. Thus, during the brushing operation, the torque is low as the brush is inserted and increases during the brushing operation as the foreign matter is removed. Generally, the torque peaks at about 22–23 in. lb. as the foreign matter is totally removed and the inside of the surface begins slightly threading. Moreover, during the tube-sizing operation, the torque applied to the roller-cage-mandrel assembly is monitored for the tube-sizing or weld-size roller operation and during the tube entrance sizing operation. A feature of this invention is to provide a strip-chart recorder connected to the control console at the remote location for performing the torque-monitoring operations as previously described. For example, during the tube entrance sizing operation, peaks 37 and plateaus 39 in the torque curve 21 are of significance and are observed by an operator at the remote-control panel until, based upon the torque curve, it is indicated that the tube entrance has been sufficiently rounded to accept a tube plug with a slight interference fit. In each of those operations, the operator manually controls the torque applied in both its on and off states.

Figure 3:
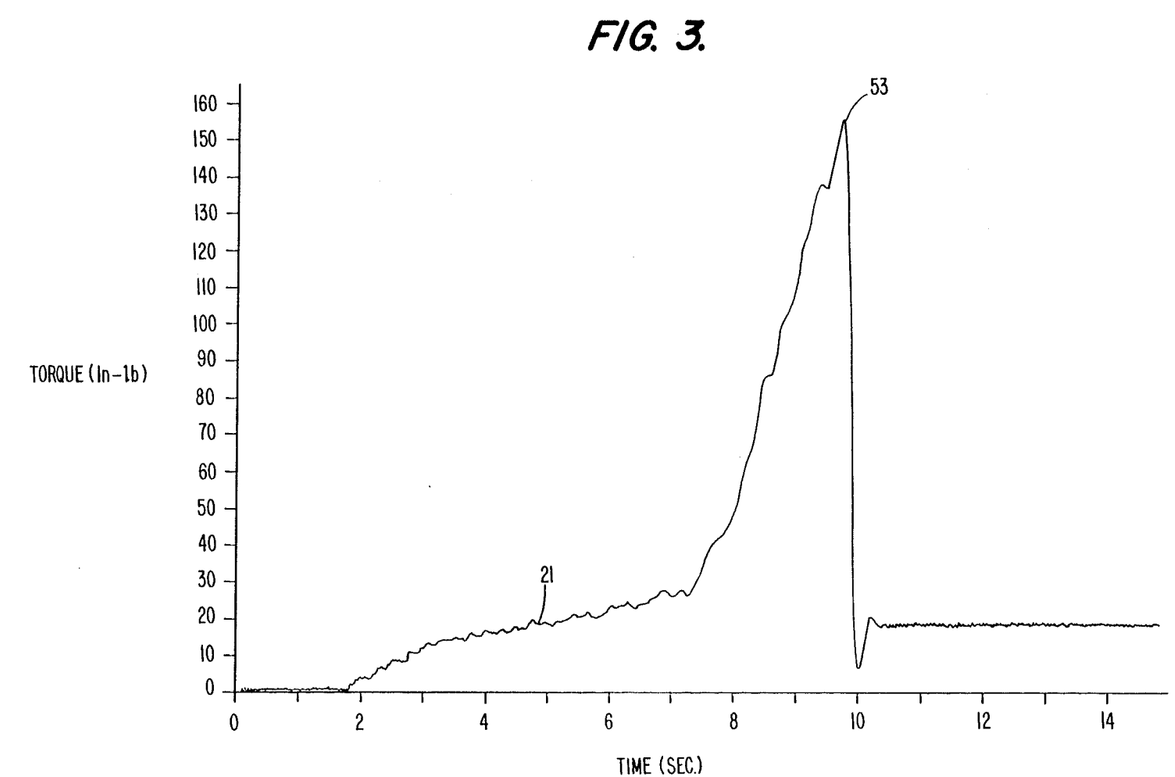
FIG. 3 is a typical torque as a function of tune curve produced by the control circuit of this invention, showing torque cutoff, such as during plug-rolling.

However, during the plug-rolling operation, the torque signal is preferably provided to a comparator 56 which compares the torque provided to a roller-cage assembly inserting in the chuck so that when the roller-cage-mandrel assembly in the plug-rolling operation reaches a predetermined set point 53, the reversible pneumatic drive 26 is tripped to an off state by actuating the solenoid valve 54 to shut off the air supply. The predetermined torque set point 53 is a threshold torque setting which must be reached during the plug-rolling operation to assure that sufficient work has been done to the tube plug to result in sufficient residual hoop stresses to assure the integrity of the seal between the tube plug and the tube 50. Thereafter, the operator reverses the direction of rotation by activating a solenoid valve 49 which in turn reverses the direction of rotation of the tube plug roller-cage-mandrel assembly for axial withdrawal. It is a feature of this invention to control the comparative and set-point operations from a position at the control panel. Thus, FIG. 2 represents a typical torque curve which is manually-controlled as to its on and off states, while FIG. 3 represents a torque curve during the plug-rolling operation which reaches its set point 53 for automatic termination, according to the alarm circuit included with the controller of this invention.

Figure 4:
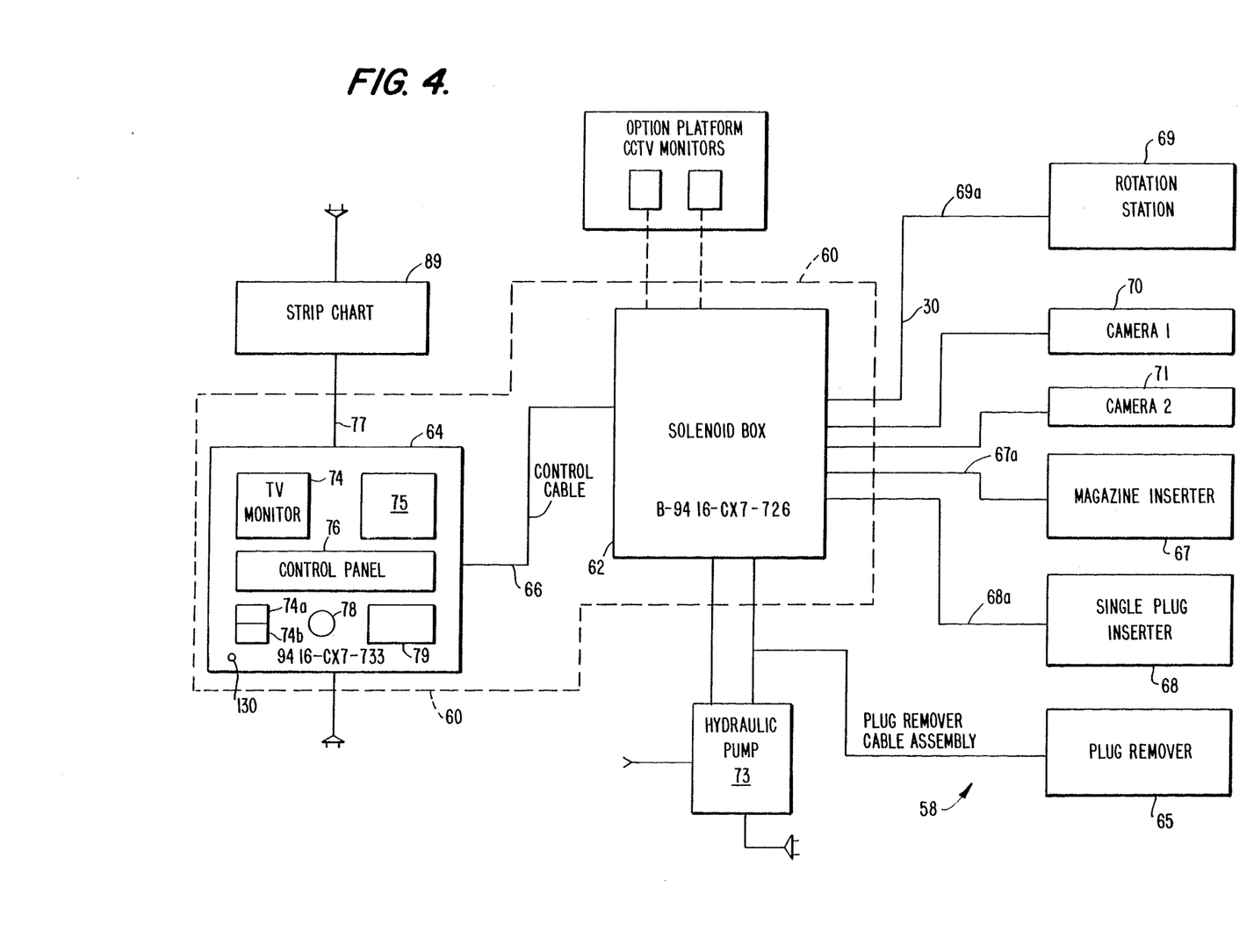
FIG. 4 is a block diagram of the components of the system showing the controller comprising a remotely-located control console and a proximately-located solenoid box for controlling the operation of the rotation station drive.

FIG. 4 shows a block diagram generally at the reference numeral 58 depicting the functions as previously described in connection with FIGS. 1–3 under the control of a controller 60 according to this invention. The controller 60 includes a proximately-located solenoid box 62 connected to a remotely-located control console 64 by a control cable 66. The controller 60 provides all of the control functions for plug removal by a plug remover 65, magazine insertion by a magazine inserter 67, plug insertion by a single plug inserter 68, and plug rolling by a rotation station 69. As noted, equipment noted by the blocks 65, 68, 67 and 69 and its operation is known to the art. Those functions, as indicated, are preferably located at a sensitive zone so that a pair of video cameras 70, and 71 are also located at that zone in order to monitor those functions at the remotely-located control console 64. The controls for each of those functions is provided on an associated lead 65a, 68a, 67a, and 69a to and from the control box 60. Thus, by way of example, the torque output from the rotation station 69 is provided on the lead 69a (including its lead 30) to the solenoid box 62 for performing its control function in sensing the torque relative to the set point 53 and to trip the circuit if the set point is reached. A hydraulic pump 73 is provided to provide hydraulic fluid to the plug remover 65 for operation in the plug removal mode.

Figure 5:
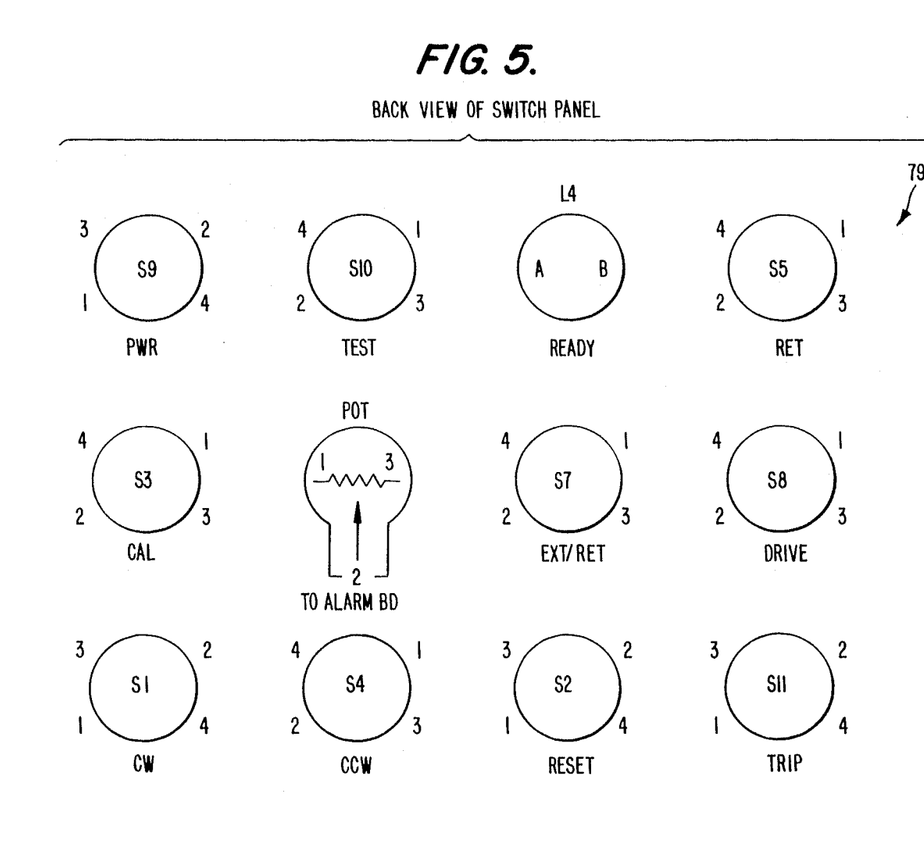
FIG. 5 is a diagram of the face of the remotely-located control panel showing manual functions of the system which are controlled by push-button switches from that location.

As shown in FIG. 4 the control panel 64 includes a pair of TV monitors 74, 75 representing two video channels respectively under the control of corresponding video channel control switches 74a, 74b each of which may comprise a plurality of push-buttons to select one of a plurality of inputs or channels. For example, cameras 70, 71 may have their inputs connected to be displayed on the TV monitor 74, so that video selector switch 74a on the array 74 would thus display the output from camera 70. A recorder 76 is also located at the control console 64 for recording torque signals or providing an output on the lead 77 to a strip-chart recorder 89. The panel may include a microphone input 78. The control panel 64 further includes a plurality of push-button switches in a control section 79 for supporting a CW (clockwise) switch and a CCW (counterclockwise) push-button switch for manually controlling the brushing, sizing, and plug-rolling operations at the functional positions 65, 68, 67, and 69. An enlarged view of those push-buttons for that functional control is shown in FIG. 5. The trip set for the torque limit cutoff comprises a potentiometer switch (POT) having its rotary dial on the face of the panel for controlling the torque cutoff.

The rear of the control panel provides a plurality of input jacks for video input and output, computer output where it is desired to record the data, a connecter for the strip-chart recorder, a connecter for the cable 66, and appropriate fusing. The main connecter on the panel is a 35 pin female Amphenol connecter and associated other connecters may be provided. All of the required connecter elements and switches on the control panel are housed in a convenient enclosure.

The solenoid box 62 includes the appropriate connecters for electrically and controlling the plug installing operations for receiving the connector for the control cable 66, and the respective inputs and outputs as shown in greater detail in FIG. 6.

FIG. 5 is an enlarged diagram, generally designated by the numeral 90 of the control switches and indicators in the panel 79 on the console 64 of the system 58 as shown in FIG. 4. Thus, a switch S9 is provided for controlling the on or off state of the control console 64. A switch S10 is provided as a momentary lamp test switch. A lamp L4 provides a lamp indication that limit switches during the insertion operations are appropriately positioned to permit rotation and insertion during the insertion function for the equipment, shown generally at the blocks 67, 68. Switch S5 controls the retraction of the equipment at 67, 68 upon command. Switch S3 is a calibration switch for calibrating the trip point in cooperation with the POT switch connected to an alarm module for setting the trip point 53 for terminating rotation during the plug-rolling operation by the rotation station 69 and for providing an emergency cut-off during other operations should the torque limits exceed a threshold set by the POT switch. Switch S7 acts as an extend and retract switch for the insertion operation by the plug inserter 67, 68 for manually controlling the extension of the cartridge-loaded plug. The driving of the plug during the insertion operation of the equipment of block 68 is controlled by drive switch S8. Clockwise rotation of the equipment and especially the rotation station 69 is controlled by the switch S1, while its counter-clockwise rotation is controlled by the switch S4. Switch S2 acts as a reset switch for resetting the clockwise (CW) rotation circuit after automatic tripping, while the trip switch S11 is an emergency backup switch to automatically trip the circuit to shut off during any of the functions, and particularly during the plug-rolling operation. These switches and their operations will be better understood in conjunction with a review of the simplified wiring diagram of FIG. 6.

A simplified wiring diagram for implementing the functions previously described for the switches of FIG. 5 on the console shows the elements on the control console 64 except for those indicated as located on the solenoid box 62 by a dotted block also labeled for simplicity as numeral 62 or components contained in a downstream location. Thus, reading generally downwardly with respect to the circuit at control console 64, the circuit is operated as hereinafter described. It should be understood that a number of conventional components such as protective circuitry in the form of protective diode/resistor/capacitor circuits in parallel with relays, and other conventional and well understood components have been eliminated for simplicity. The connections between the circuits at the console 64 and the solenoid box 62 are shown connected through a plurality of conventional connectors. In some cases, as explained, external modules are shown and labeled, as connected to either component, i.e, the console 64 or the box 62.

The control console 64 thus includes a source of power 100 connected to a plug connector 102 to provide an AC source of power. Closure of the switch S9 on the panel 79 provides power to a transformer 104 to provide a 24-volt output source of power on leads 106 and 108. Switch S10 is a momentary test switch for testing the light L1 while light L8 indicates that the power is on. Assuming that the POT switch has been adjusted to a predetermined trip set point such as 142 in. lb., the circuit is ready for control operations. As a practical matter, in order to terminate rolling at a desired torque of 150 in. lbs., the trip set is established at about 142 in. lbs. to account for the inertia of the equipment after termination of power. Such calibration occurs by operating the switch S3 in connection with an NBS standard, as is well-known in the art, as will be further explained.

To rotate the equipment clockwise, as shown at a "Rotate CW" line 107, switch S1 is momentarily closed to energize a relay coil CR2 through a NC contact CR3-1 to close the contactor CR2-1 to latch the switch S1 during the clockwise (CW) rotation function. The reset switch S2 is in its normally closed position in the CW rotation control line. Thus at the second "Rotate CW" line 110, the relay CR2-2 is closed to provide a signal to the solenoid box 62 to actuate a clockwise rotation solenoid 112 to power the system equipment in a clockwise rotation through a connector 114 at the output of the solenoid box 62. When the clockwise rotation switch S1 is closed, a normally closed relay CR2-3 in the CCW rotation line 113 is open so that S4 is interlocked to prevent a CCW rotation signal from being operative.

An alarm module 111 is located on the console 64 to cooperate with the POT switch to establish the trip set point discussed above. The alarm module is available as a unit from Rochester Instrument Systems, Inc. (RIS), as model number ET1214 and has a normally-opened (NO) contact in parallel with NO relay CR3-2. When the set trip point, such as at 142 in. lbs., is reached, the NO relay 116 closes to energize the coil CR3 to light the lamp L2 and to open the relay CR3-1 to stop CW rotation. If, during brushing, for example, it is desired to continue beyond the set trip point, the trip switch S11 is depressed to again initiate CW rotation as previously described.

The alarm module 111 receives the input from the torque transducer 48 in FIG. 1 from the solenoid box 60 at its input leads 118 which are also connected as an output to the strip-chart recorder 89 shown in FIG. 4. The torque transducer 48 provides a millivolt signal input to a strain gauge 120 in the solenoid box 62 which provides a millivolt output to an amplifier module 122 to convert the millivolt signal to a current signal to be provided on the leads 118 to the alarm. The amplifier module is commercially available from RIS under the model number CS1390. At the input side of the strain gauge 120 in cooperation with the external amplifier module 122, the calibrate switch S3 may be closed to calibrate the system with a calibration circuit indicating zeroing, span, and trip point as a part of the operations of the module 122. Any imbalance in the strain gauge 120 as a result of the signal from the torque transducer 28 provides a current signal to the alarm which trips at the set point to cease actuation of the CW rotation circuit 107, 110 as previously described, to cease rotation of the equipment.

If the CW rotation circuit has tripped, as previously described, its operation may be reset by the closure of the switch S2 to comprise a reset circuit to initiate the operation previously described. In addition, the trip may be defeated by depression of the switch S11, as previously described.

The counter-clockwise (CCW) rotation circuit 113 will now be described, assuming that the CW operation has been completed or has been terminated by alarm tripping, thus apprising the operator that retraction of the equipment is in order. Since the CW equipment has tripped, the CCW circuit 113 is no longer interlocked, so that momentary depression of the switch S4 will initiate operation of the CCW circuit.

A portion of the insertion operation is contained on the solenoid box and incorporated with a ready light on the console 64. During the insertion operation, limit switches 123 indicate that the equipment is ready for plug insertion, while another pair of limit switches 124 indicates that the plug is ready for insertion upon depression of the drive switch 58.

The switch S5 acts as a pump-on switch for the hydraulic operation of the equipment so that the hydraulic pump 73 (FIG. 4) is operated by actuating a relay coil to drive the hydraulic removing tool during the plug-removing operation of the equipment 65. When actuated, lamp L5 is lit.

The extension and retraction of the inserter 68 is controlled by the switches S7 and S8 on the control console which respectively illuminates lamps L6 and L7. Those switches are respectively connected to solenoids 125 and 126 on the solenoid box 62 which are connected in turn to the equipment to extend and retract the inserter during the insertion operation. Specifically, the switch S7 causes the equipment to be extended to receive a cartridge loaded plug by the magazine inserter 67 where the cartridge loads a plug for insertion, while the drive switch S8 causes the plug to be driven into the heat exchanger by the equipment 68 as previously described.

The video equipment at the work site is indicated generally within the block 130 and includes the video cameras 70 and 71 as previously described. Those cameras are equipped for both audio and video functions and are provided with power from the transformer 132. The module 130 also provides a pair of camera lights 134 at the work site for illuminating the area viewed by the video equipment for ease of monitoring at the console 64 by the operator. The intensity of the camera lights is controlled at the console 64 by rotation of an intensity switch 138 cooperating with a Darlington amplifier 139. The audio and video outputs from the video cameras are provided to the control console through a connecter and the cable 66 to the switches 74a, 74b so that their output may be respectively viewed on the monitors 74, 75 as previously described. The control console 64 also includes an auxiliary video input jack for channels C and D of the switches so that alternative video signals may be provided. Those signals may also be permanently recorded on a VCR 142 which is connected to a microphone 144 at the control console 64 for overlaying audio signals, such as data concerning the date of the test, the time, conditions, and so forth, on to a video tape recorder so that a permanent record on video tape may be provided concerning the installation of the mechanical tube plugs.

The sound at the work site may also be monitored. The sound signal mixed and amplified by the circuit 150 to be provided at an audio speaker 152 or to a head set 154 (at the console 64) for monitoring by the operator. The details of the preamplifiers 154, 155, speaker 156, and VCR 142 and their interconnections need not be discussed in detail as conventional. They provide, however, significant features at the control console for recording the conditions of mechanical plugging.

These and other features of the operation of the control system according to the invention will be apparent to those skilled in the art.

Thus, it will clearly be understood by those skilled in the art that the foregoing description has been made in terms of the preferred embodiments and various changes and modifications may be made without departing from the scope of the present invention which is to be defined by the appended claims.

What is claimed is:

1. In an apparatus for installing a mechanical tube plug used to seal a heat exchange tube of the type in a nuclear facility and comprising means for rolling said mechanical tube plug and providing a signal indication of torque while rolling, comprising:

a controller console having a plurality of switches and indicators for providing a rotation control signal for controlling rotation of said rolling means, said controller located at a point which is relatively safe and remote from a potentially unsafe site of said rolling means; and a solenoid assembly located proximate to said site of rolling in said potentially unsafe area and in circuit with said controller, said solenoid receiving said rotation control signal and including circuit means for receiving said torque indication signal, said solenoid assembly including means for setting a predetermined torque, in response to a signal input at said control console, said circuit means operating to terminate said rotation control signal and disable said rolling means when said predetermined torque limit is reached.

2. An apparatus as set forth in claim wherein said control console further includes means for providing a second rotation control signal for controlling rotation of said rolling means in an opposite direction.

3. An apparatus as set forth in claim 1 wherein said control console further includes movable switch means for changing the setting of said predetermined torque for said setting means at said solenoid assembly.

4. An apparatus as set forth in claim 1 wherein said control console further includes means for interlocking out said second rotation control signal when said rotation control signal is provided from said controller console.

5. An apparatus as set forth in claim 1 wherein said solenoid assembly further includes a torque transducer, including a strain gauge, for providing a voltage signal to an alarm means, said alarm means providing a current output to an alarm on said control console and terminating said rotation signal.

6. An apparatus as set forth in claim 1 wherein said control console includes means for resetting said rotation circuit after tripping to override said predetermined torque.

7. An apparatus as set forth in claim 1 wherein said control console further includes means for controlling plug insertion, said plug insertion control means being responsive to limit switches indicating that said plug is ready for insertion.

8. An apparatus as set forth in claim 1 wherein said control console further includes a switch acting as a pump-on switch to control a hydraulic circuit for actuating plug removal equipment which operates in cooperation with said rolling means.

9. An apparatus as set forth in claim 1 wherein said control console further includes control means for extending or retracting said means for inserting said plug.

10. An apparatus as set forth in claim 1 further including video equipment at said rolling means site to provide a real-time image of said plug-rolling operation, and lights for illuminating said video area, said control console including means for controlling the intensity of said light.

11. An apparatus as set forth in claim 1 wherein said control console includes means for recording said torque signal, and for recording a video signal from said video equipment.

12. An apparatus as set forth in claim 1 further including sound pick up means located at said site, said control console including means for receiving said sound at said control console.

13. An apparatus for installing a mechanical tube plug used to seal a heat exchange tube of the type in a nuclear facility and comprising means for cleaning and sizing an opening in a heat exchanger; inserting a tube plug, and rolling said tube plug, while providing a signal indication of torque rolling, at least during said cleaning, sizing, and inserting steps, comprising:

a controller console having a plurality of switches and indicators for providing a rotation control signal for controlling rotation of said rolling means, said controller located at a point which is relatively safe and remote from a potentially unsafe site of said cleaning, sizing, inserting, and rolling means; and a solenoid assembly located proximate to said site of said rolling means in said potentially unsafe area and in circuit with said controller console, said solenoid receiving said rotation control signal and including circuit means for receiving said torque indication signal, said solenoid assembly including means for setting a torque, in response to a signal input at said control console, said circuit means operating to terminate said rotation control signal and disable said rolling means when said predetermined torque limit is reached.

14. An apparatus as set forth in claim 13 wherein said control console further includes means for providing a second rotation control signal for controlling rotation of said rolling means in an opposite direction.

15. An apparatus as set forth in claim 13 wherein said control console further includes movable switch means for changing the setting of said predetermined torque for said setting means at said solenoid assembly.

16. An apparatus as set forth in claim 13 wherein said control console further includes means for interlocking out said second rotation control signal when said rotation control signal is provided from said controller console.

* * * * *